United States Patent Office 2,977,082
Patented Mar. 28, 1961

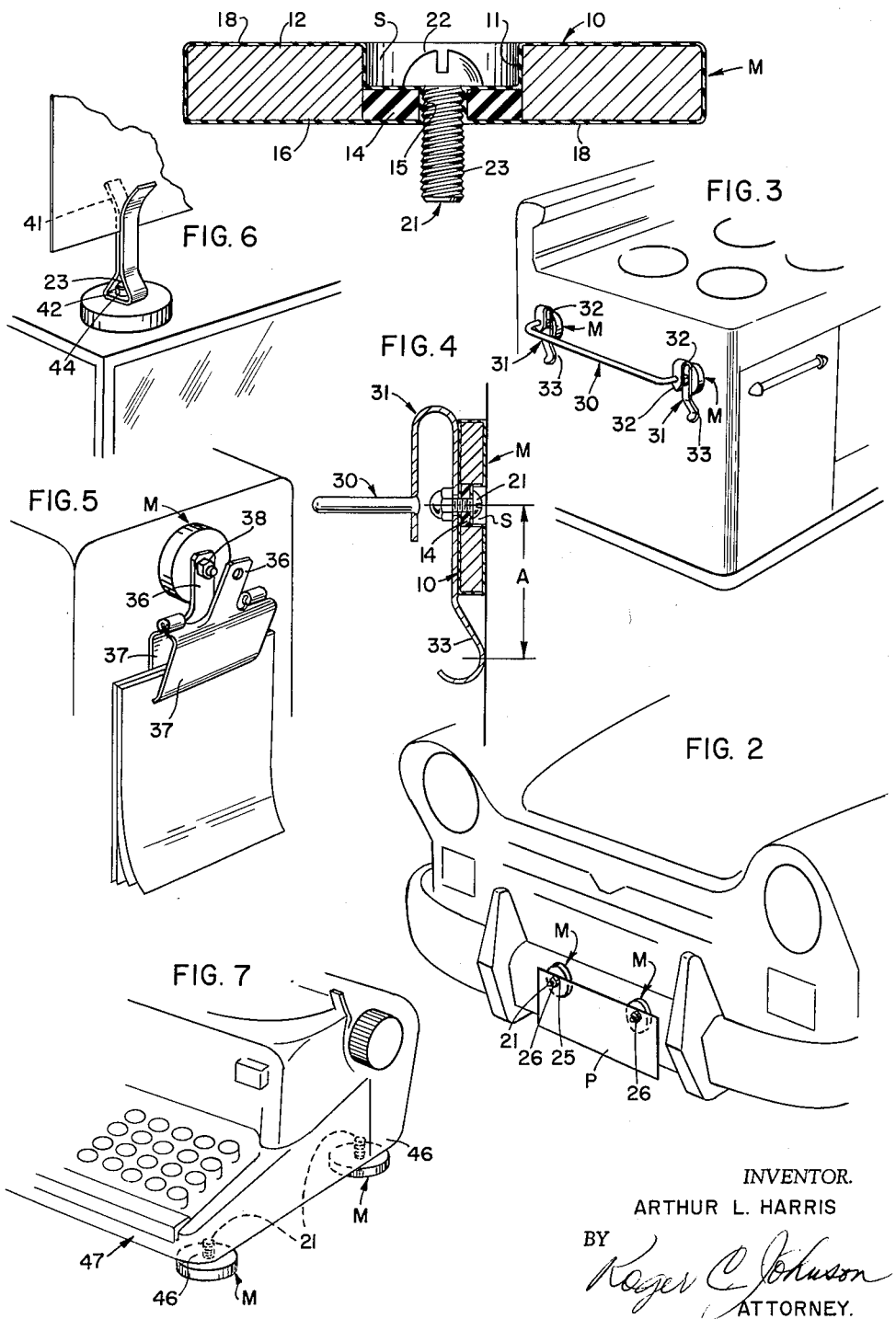

2,977,082

MAGNETIC SUPPORT

Arthur L. Harris, Le Claire Hotel, Moline, Ill.

Continuation of application Ser. No. 775,429, Nov. 21, 1958. This application Aug. 1, 1960, Ser. No. 46,681

8 Claims. (Cl. 248—206)

This application is a continuation of my copending application, Ser. No. 775,429, filed Nov. 21, 1958, for Magnetic Support, now abandoned.

The present invention relates generally to article supporting devices, especially those including permanent magnets for fixing such devices to metallic supporting surfaces or objects.

The object and general nature of this invention is the provision of a magnetic support employing ring magnets with new and improved means for connecting the articles or objects to be attached to the magnetic supports.

Specifically, it is an object of this invention to provide a ring magnet with a non-metallic insert that is apertured, and to entirely enclose the magnet and insert in a relatively thin layer of rubber-like material, thereby forming a homogenous covering that not only holds the insert in position but materially increases the frictional grip of the magnet on the metallic supporting surface, yet not materially reducing the holding power of the magnet.

Another feature of this invention is the provision of magnetic holding means in the form of a ring magnet having article-receiving means extending from one face thereof while the other face is substantially flat and fits close against the associated metallic supporting surface so that the full power of the magnet may be realized to hold the device in place against both accidental and gravitational displacement. More specifically, it is a feature of this invention to dispose the nonmetallic insert in the ring magnet opening so that there is a space between the insert and the plane of the adjacent surface of the magnet so that the article-receiving means may take the form of a screw threaded bolt and the head disposed in said space so as not to extend above the plane of the face of the magnet.

Further, it is a feature of this invention to provide a pair of such magnetic holding units, each with a screw threaded extension at one side of the associated magnet to extend through one of the usual openings in an automobile license tag or plate, and nuts tightened on the threaded extensions so that magnetic attaching units fixedly receive the associated license plate and, when applied to an adjacent portion of an automobile body, serve to securely but removably hold the plate to the car. Means of this character is especially useful to automobile dealers who in the conduct of their business are frequently required to attach and remove their dealers' plates to and from cars that temporarily may require plates attached thereto. In using devices of this invention the dealers need not screw and unscrew bolts, fasten and detach springs or the like, it being necessary only to bring the magnetic holders up to the car body and then the plate will be held thereto with sufficient security that the plate will not be jarred loose or blown off during travel of the car.

Still further, a feature of this invention is the provision of a towel rack that, utilizing the magnetic holders of this invention, is so constructed and arranged with downward extensions such that the towel rack is securely held against downward displacement, first, by the frictional contact between the layer of rubber-like material surrounding the magnet proper and the magnetic surface against which the towel rack is disposed, and, second, by the increased force exerted by the magnets, acting about the downward extensions as a fulcrum, and acting to resist downward displacement of the rack caused by, for example, excess weight of towels thereon.

It is to be understood that by the term "ring magnet" I refer not only to circular magnets but to magnets of any shape having a generally central opening and continuous pole sections.

These and other objects and advantages of this invention will be apparent to those skilled in the art after a consideration of the following detailed description of the preferred embodiments, taken in conjunction with the accompanying drawings in which said embodiments have been shown by way of illustration. In the drawings:

Fig. 1 is a central sectional view showing the ring magnet, the non-metallic insert, the enclosing layer of rubber-like material and the article-receiving part connected to the insert.

Fig. 2 illustrates a license plate equipped with two of the holding magnets shown in Fig. 1.

Fig. 3 shows a towel rack having holding magnets and new and improved associated bracket structure.

Fig. 4 is an enlarged section taken through one of the brackets of Fig. 3.

Fig. 5 illustrates the present invention as incorporated in a magnet supported clip device.

Fig. 6 shows a magnet supported upright spring-biased card holder.

Fig. 7 shows this invention in the form of a magnetic cushioned support for typewriters and the like.

Referring first to Fig. 1, a ring magnet that is commercially available is shown at 10 and is formed with a central opening 11. As presently employed, the ring magnet 10 has eight poles effective at the face 12 to attract iron and steel. Disposed in the central opening 11 is an insert 14 perferably formed of nonmetallic material, such as hard rubber. The center of the insert has an opening 15 that is unthreaded and has an overall diameter that substantially is no smaller than the diameter of the opening 11 in the ring magnet. The insert 14 is forced into the magnet opening 11 to the point where the outer plane of the face of the insert is flush with the other face 16 of the magnet. The thickness of the insert is appreciably less than the thickness of the ring magnet 10 so that there is a space S between the magnet face 12 and the adjacent face of the insert.

The magnet 10 and the insert 14, assembled as just described, are enclosed in a homogeneous layer of rubber-like material, as shown at 18, preferably in a molding operation that surrounds the magnet, the insert, and even the walls of the insert opening 15 with a relatively thin, tough film that serves to hold the two parts together and, in addition, disposes a friction surface on the magnet face 12 that prevents slipping between the magnet unit and even a very smooth metallic surface on which the unit is mounted or to which it is attached.

An article-receiving or supporting member in the form of a bolt 21 having a head 22 and a threaded shank 23 is carried by the insert 14 with the head 22 disposed in the space S and the threaded shank extending through the insert opening 15. The latter is unthreaded but the threads of the shank cut or are pressed into the adjacent portions of the layer 18 and/or the hard rubber-like material of which the insert is made. The threaded shank extends outwardly from the flush face 16 of the magnet, the material 18 covering the insert and the magnet. When the magnet unit as described above is attached to a supporting surface of iron or steel or the like the magnet is strongly attracted thereto and various articles or the like may be connected to the shank 23 of the insert-carried part 21. It will be seen from Fig. 1 that the bolt head 22 is spaced from the face 12 of the magnet so as not to interfere with the firm positive attraction between the magnet and the associated supporting surface nor can the bolt head, so disposed within the space S, mar said surface. Also, since the bolt 21 is not connected directly to the ring magnet 10 but only through the somewhat flexible insert, the connection of the article to the magnet is cushioned.

The magnetic supporting units, hereinafter referred to by the reference character M, has a wide variety of uses. For example, a pair of such units may be used by automobile dealers for temporarily attaching dealers' license plates to cars they are required to drive from place to place. As shown in Fig. 2, the shank 23 of a bolt 21 is inserted through the usual opening 25 in one of the lower or upper corners of the plate P, and the unit M fixed thereto by a nut 26. A second unit M is fixed in the same way to the other upper or lower corner of the plate and secured by a nut 26. The license plate may then be attached to a car merely by bringing the units M up to a flat portion of the car body, or against a bumper or other convenient part. The units hold with sufficient force that the license plate P will not be dislodged by jars, wind pressure or the like in normal use, yet may instantly be detached merely by pulling the plate P away from the car body.

The units M are admirably adapted to be used for attaching a towel rack or bar to the sides of a refrigerator, range, cabinet or other domestic appliance or the like, having metal sides. Referring now to Figs. 3 and 4, a towel rack bar 30 has its ends fixed to brackets 31, a portion 32 of which is apertured to receive the shank 23 of the associated unit M and a portion 33 of which extends downwardly to form a support-engaging part that lies an appreciable distance below the associated magnetic unit M. The layer 18 of each unit M assures that the units will not slide down the side of the associated cabinet or other unit on which the towel rack is mounted, and the depending bracket parts 33 provide a relatively long lever arm A about which the magnetic force acts to prevent the weight of towels on the rack from pulling the units M away from their support surface.

For attaching articles to a vertical surface, one of the units may have its threaded shank extended through the handle portion 36 of a spring clip having a pair of such handle portions and a pair of spring biased swingable ends 37. A nut 38, as shown in Fig. 5, holds the slip handle 36 to the magnet face. This unit may be used to attach price cards to the larger appliances having flat vertical surfaces. Another use is to attach shop cards, routing cards, assembly instructions, and the like, to shop equipment such as machine tools and the like. The cards or other articles are securely held yet may instantly be detached by pulling the unit away from the supporting suraface, or by releasing the card from the clip while the unit M remains attached to the machine.

Another type of card holder is shown in Fig. 6, being especially designed for attachment to a horizontal surface, such as the top of a refrigerator, range or the like, in which case the card may be a price tag or some advertising medium. The card engaging part is illustrated in Fig. 6 as including a pair of spring biased portions 41 urged toward one another and a central section 42 that is apertured to receive the shank 23 of the associated unit M against the flat face of which the central portion 42 is held by a nut 44 screwed onto the shank 23.

Fig. 7 illustrates another use of the units M of my invention. In this figure the fasteners 21 of the units M may be arranged to screw into the threaded lug portion 46 of a typewriter 47. The sections 14 provide some cushioning action and the magnet units M act to positively hold the typewriter to a metal table or support so that the typewriter does not tend to shift, yet may easily be lifted from the support when desired.

While I have shown and described above the preferred structure in which the principles of my invention have been incorporated, it is to be understood that widely different means may be used in the practice of the broader aspects of my invention.

Having described the preferred forms of my invention, what I claim and desire to secure by Letters Patent is:

1. An article support comprising a base that includes a ring magnet having an opening, an insert of hard rubber material or the like having a generally central opening therethrough and an external diameter substantially no smaller than the diameter of said ring magnet opening so that when the insert is forced into said magnet opening the insert is frictionally retained therein, said insert being located in the magnet substantially flush with one face of said ring magnet but appreciably below the opposite face of the magnet, thereby providing a space, a relatively thin layer of substantially homogeneous rubber-like material completely surrounding said ring magnet, said insert and the walls of the central opening in the latter, a member having a head and a threaded shank, the latter being threaded completely from head to end and adapted to be screwed into said latter opening and thereby removably carried by the magnet through said insert, the threads of said member being embedded into the adjacent layer of rubber-like material, said insert opening being unthreaded, the head of said member being disposed in the space between the insert and said opposite face of the magnet, the threaded shank of said member having such length as to extend outwardly from said one face of the magnet and forming an article-receiving support for an article connected therewith and bearing through said interposed layer against said one face of the magnet and the side of the insert that is flush therewith.

2. An article support comprising a base that includes a ring magnet having an opening, an insert of hard rubber like material or the like having a generally central opening therethrough and an external diameter substantially no smaller than the diameter of said ring magnet opening so that when the insert is forced into the magnet opening the insert is frictionally retained therein, said insert being located in the magnet opening so that one face of the magnet lies substantially flush with one face of the ring magnet while the other face of the insert lies appreciably below the opposite face of the magnet, thereby providing a space, a relatively thin layer of substantially homogeneous rubber-like material completely surrounding said ring magnet and insert and extending into the central opening in the latter and integrally lining the walls of said central opening, and an article supporting part tightly engaged in the opening in said insert and held in place in the magnet solely by said insert, said supporting part being provided with a portion disposed in said space and lying below the other face of the magnet and an exterior portion extending outwardly beyond said flush faces of said insert and magnet and adapted to hold an article generally flat against said enclosing layer covering said flush faces.

3. An article support comprising a base that includes a ring magnet having an opening, an insert of hard rubber material or the like having an external diameter at least substantially no smaller than the opening in said magnet and having a thickness approximately half that of the ring magnet so that when the insert is forced into the magnet the insert is frictionally held therein, one side of the insert being substantially flush with one side of the magnet, a relatively thin layer of substantially homogeneous rubber-like material of substantially uniform thickness completely surrounding said magnet and said insert and in intimate contact therewith, said layer serving to retain the insert in said magnet opening and in the proper position relative thereto, and article-receiving means connected to said insert, said article-receiving means including a member having screw threads and threaded into and through the generally central portion of said insert and through said layer, and insert forming the sole connection between the magnet and said article supporting part, the latter extending outwardly from the flush faces of said insert and magnet.

4. An article support comprising a base that includes a magnet having an opening, an insert of hard rubber or similar material having a generally central opening therethrough, said insert being located in the magnet opening so that one face of the insert lies substantially flush with one face of the magnet while the other face of the insert lies appreciably below the opposite face of the magnet, thereby providing a space, a relatively thin layer of substantially homogeneous rubber-like material surrounding said magnet and extending into the magnet opening and connected with opposite portions of said insert, a member having a head and a threaded shank, the latter being adapted to be screwed into the insert opening and thereby removably carried by magnet through said insert, the head of said member being disposed in the space between the insert and said opposite face of the magnet, the threaded shank of said member having such length as to extend outwardly from said one face of the magnet and forming an article-receiving support for an article connected therewith and bearing through said interposed layer against said one face of the magnet and the side of the insert that is flush therewith.

5. An article support comprising a base that includes a magnet having a through opening, an insert of hard rubber or similar material having a generally central opening therethrough, said insert being located in the magnet opening so that one face of the insert lies substantially flush with one face of the magnet while the other face of the insert lies appreciably below the opposite face of the magnet, thereby forming a space, a relatively thin layer of substantially homogeneous rubber-like material surrounding said magnet and extending into the opening and engaging opposite side portions of said insert, and an article supporting part tightly engaged in the opening in said insert and held in place in the magnet solely by said insert, said supporting part being provided with a portion disposed in said space and lying below the other face of the magnet.

6. An article support comprising a base that includes a magnet having an opening therethrough, an insert of rubber-like material appreciably thinner than the thickness of the magnet and having a generally central opening therethrough, said insert being located in the magnet opening so that one face of the insert lies substantially flush with one face of the magnet while the other face of the insert lies appreciably below the opposite face of the magnet, thereby providing a space, a relatively thin layer of substantially homogeneous rubber-like material surrounding said magnet and extending into the opening of the magnet and connected with opposite portions of the insert, and an article supporting part having a head lying in said space and a portion extending through said insert opening and beyond the flush faces of said magnet and insert.

7. An article support that includes a magnet having an opening therethrough, an insert of rubber-like material thinner than the thickness of said magnet and having a generally central opening, said insert being located in the magnet opening, a relatively thin layer of substantially homogeneous rubber-like material surrounding said magnet and extending into the opening of the latter and engaging opposite portions of said insert and serving to hold the insert in place in the magnet opening, and article supporting means fixed to said insert.

8. An article support comprising a magnet having an opening therethrough, an insert of a material having some flexibility greater than that of the magnet disposed in said opening, and a relatively thin layer of substantially homogeneous rubber-like material surrounding said magnet and extending into said opening and engaging opposite sides of said insert so as to hold said insert in place in said opening.

References Cited in the file of this patent

UNITED STATES PATENTS

| | | |
|---|---|---|
| 1,418,701 | Corcoran | June 6, 1922 |
| 1,702,472 | Fricker | Feb. 19, 1929 |
| 2,006,843 | Russell | July 2, 1935 |
| 2,474,942 | Hawkins | July 5, 1949 |
| 2,709,245 | Schneider | May 24, 1955 |
| 2,724,048 | Sherbinin | Nov. 15, 1955 |